United States Patent [19]

Hiramatsu et al.

[11] Patent Number: 4,481,461

[45] Date of Patent: Nov. 6, 1984

[54] SWITCHING REGULATOR

[75] Inventors: Rihei Hiramatsu, Tokyo; Ko Takeshita, Kanagawa; Tokunari Inoue, Tokyo, all of Japan

[73] Assignee: Densetsukiki Industry Co., Ltd., Tokyo, Japan

[21] Appl. No.: 430,064

[22] Filed: Sep. 30, 1982

[30] Foreign Application Priority Data

Oct. 23, 1982 [JP] Japan ............................ 56-169876

[51] Int. Cl.³ .............................................. G05F 1/46
[52] U.S. Cl. .................................. 323/272; 323/282; 323/290; 323/350
[58] Field of Search ............... 323/222, 269, 265, 268, 323/271, 272, 282, 290, 350, 351; 363/20, 21

[56] References Cited

U.S. PATENT DOCUMENTS

| | | | |
|---|---|---|---|
| 3,096,475 | 7/1963 | Brooks | 323/269 |
| 3,274,446 | 9/1966 | Nagata | 323/282 X |
| 3,558,892 | 1/1971 | Seeley | 323/269 X |
| 3,801,894 | 4/1974 | Spiegel | 323/269 X |
| 4,017,745 | 4/1977 | McMahon | 323/282 X |

FOREIGN PATENT DOCUMENTS 419865  8/1974  U.S.S.R. ............................ 323/222

*Primary Examiner*—William M. Shoop
*Attorney, Agent, or Firm*—Flynn, Thiel, Boutell & Tanis

[57] ABSTRACT

A device including a main circuit comprising a switching main transistor unit, a smoothing reactor, a smoothing condenser and a commutation diode. To control the conduction and nonconduction of said main transistor unit by means of the output obtained by detecting and amplifying the output voltage of said main circuit, the main transistor unit comprises at least two main transistors connected in parallel with each other. A secondary winding of a current transformer is connected between the bases of the main transistors. A parallel circuit comprising a diode and a condenser is connected between the neutral point of the secondary winding and the emitters of the main transistors. A control circuit comprises two transistors which are conductive and nonconductive alternately and outputs derived from the latter transistors are applied alternately to two primary windings of the current transformer and provision is made to short the ends of the primary winding of the current transformer while the two transistors of the control circuit are both nonconductive.

7 Claims, 10 Drawing Figures (a) Collector Voltage (Vc) of Main Transistor (1)

(b) Collector Current (Ic) of Main Transistor (1)

(c) Base Current (Ib) of Main Transistor (1)

(d) Emitter·Base Voltage (Veb) of Main Transistor (1)

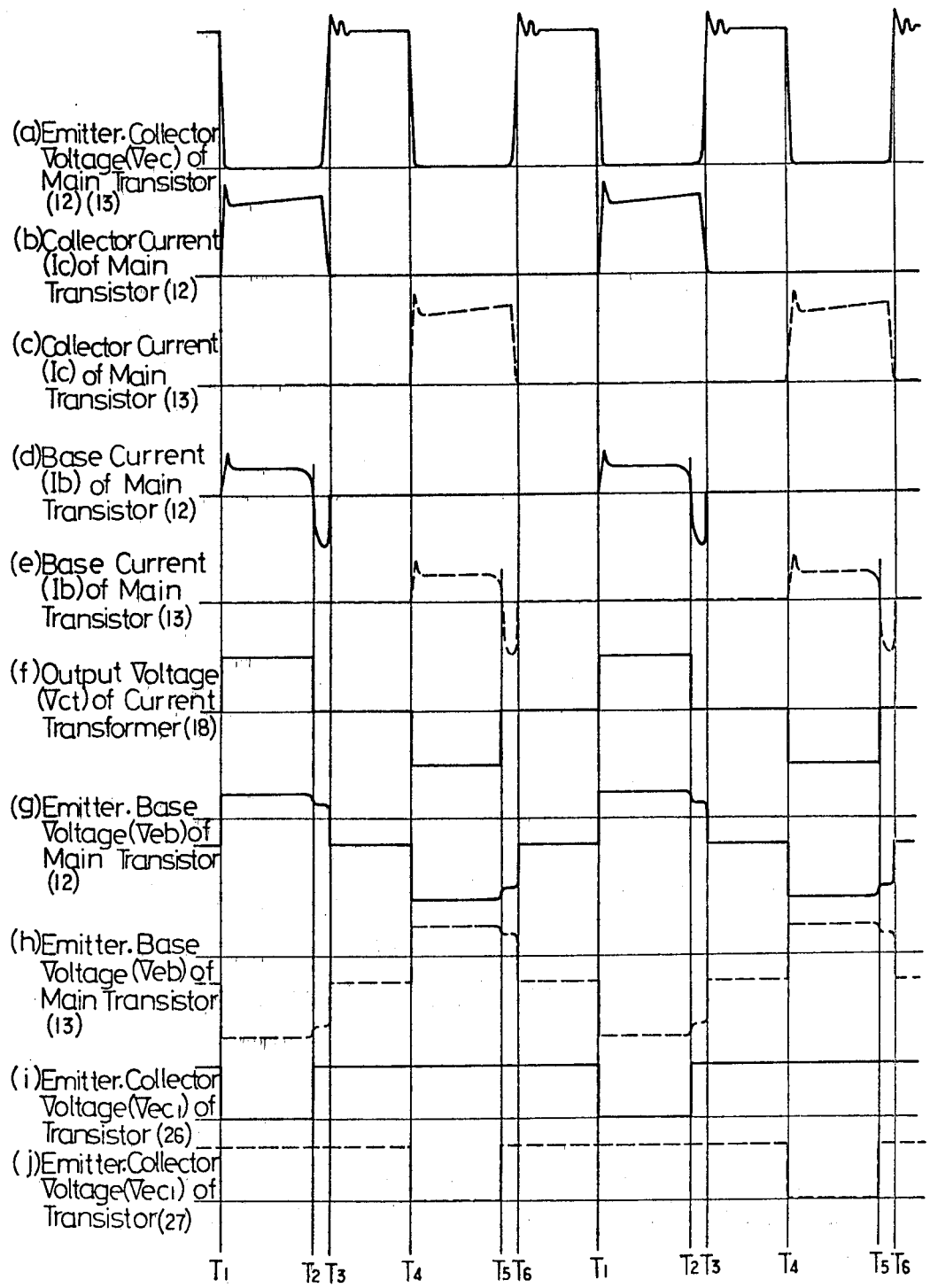

SWITCHING REGULATOR

BACKGROUND OF THE INVENTION

Field of the Invention

The present invention relates to a switching regulator incorporating a transistor which ensures stable operation and high operating efficiency and further enables making in compact size with higher frequency.

The switching regulator of this type generally comprises, in principle, a switching transistor (1), a smoothing reactor (2), a smoothing condenser (3), a commutation diode (4) and a control circuit (5) as shown in FIG. 1 and FIG. 2. Moreover, (10) and (11) are a d-c power terminal and (42) and (43) are an output terminal.

FIG. 1 shows a series type constructed by connecting said transistor (1) in series with a load (a so-called voltage dropping chopper type) and FIG. 2 shows a parallel type constructed by connecting the transistor (1) in parallel with the load (a so-called voltage increasing booster type). A practical circuit constructed based on the principle of FIG. 1 is shown in FIG. 3. In FIG. 3, in order to increase the current amplification factor of the main transistor (1), said main transistor (1) and an auxiliary transistor (6) are connected like a Darlington circuit or complementary circuit and further a control transistor (7) is connected between the main transistor and a negative power terminal (11) to assure allowance with respect to voltage across positive and negative power terminals (10) and (11).

Also in a circuit constructed for the purpose of obtaining large output, as shown in FIG. 4, a transformer (8) is connected between the base and emitter of the main transistor (1) thereby to raise the whole availability of the main transistor (1) by increasing the current amplification factor of the main transistor (1) and also disconnecting electric potential as desired according to the winding ratio of said transformer (8).

Even though the means shown in FIG. 4 is taken, however, there are the following shortcomings. The present invention has obviated these defects completely. First, the defects involved in the circuit of FIG. 4 are analysed. (a), (b), (c) and (d) in FIG. 5 are the collector voltage ($V_c$), collector current ($I_c$), base current ($I_b$) and voltage ($V_{eb}$) across emitter and base of the main transistor (1) in FIG. 4, respectively.

And, ($T_{on}$) and ($T_{off}$) denote ON time and OFF time of the main transistor (1), ($T_o$) is a time that base current of the main transistor (1) is supplied by energizing a control transistor (7) and ($T_s$) is the storage time of the main transistor (1) after said control transistor (7) is deenergized.

The circuit in FIG. 4 is so constructed as to control output voltage by controlling said ($T_{on}$) and ($T_{off}$) with a control circuit (5) and when giving an account of (d) in FIG. 5 then, it is seen that voltage ($V_{eb}$) across the emitter and base of the main transistor (1) is, on the other hand, the secondary voltage of the aforesaid transformer (8). The voltage time products, i.e., positive and negative hatched parts (A) and (B) in FIG. 5 must be equivalent accurately. For instance, provided that the values of the voltage across emitter and base in positive application and negative application are equal, $T_{on}$ should become almost equal to $T_{off1}$. Therefore, when a suitable means is taken for the base circuit, the time can be reduced to $T_{off2}$ as given by the characteristic shown by short dashes in FIG. 5; however for $T_{on}$, $T_{off2}$ is a controllable limit.

In this case, too, the time products (A) and (C) are equivalent as seen from FIG. 5.

In any way, using the transformer (8) in asymmetrical form positively and negatively causes various obstacles. To be concrete, in time $T_r$ after time $T_{off1}$, voltage ($V_{eb}$) across emitter and base should become zero as the transformer (8) is saturated in negative direction. However actually, as shown by short dashes in FIG. 5, voltage ($V_{eb}$) across emitter and base fluctuates, whereby the collector current ($I_c$) of the main transistor (1) is induced as shown by the characterictic (D) in FIG. 5 (b), resulting in the main transistor (1) working unstably.

Thus, the description about the series type has been given above and it is the same as with a case where the transformer is provided in the parallel circuit shown in FIG. 2.

SUMMARY OF THE PRESENT INVENTION

It is an object of the present invention to make the maximum use of the characteristics of the transformer now that it is employed.

It is another object of the present invention to render the main transistor operative stably.

It is more object of the present invention to improve the operating efficiency of the circuit and capsulize reasonably the circuit with higher frequency.

Further more object and features of the present invention will be more clearly understood by reference to the following detailed description thereof.

BRIEF DESCRIPTION OF THE DRAWINGS

FIG. 7 is a diagrammatic representation of the waveforms of each part in FIG. 6.

DETAILED DESCRIPTION OF THE PREFERRED EMBODIMENTS

Figure 6:
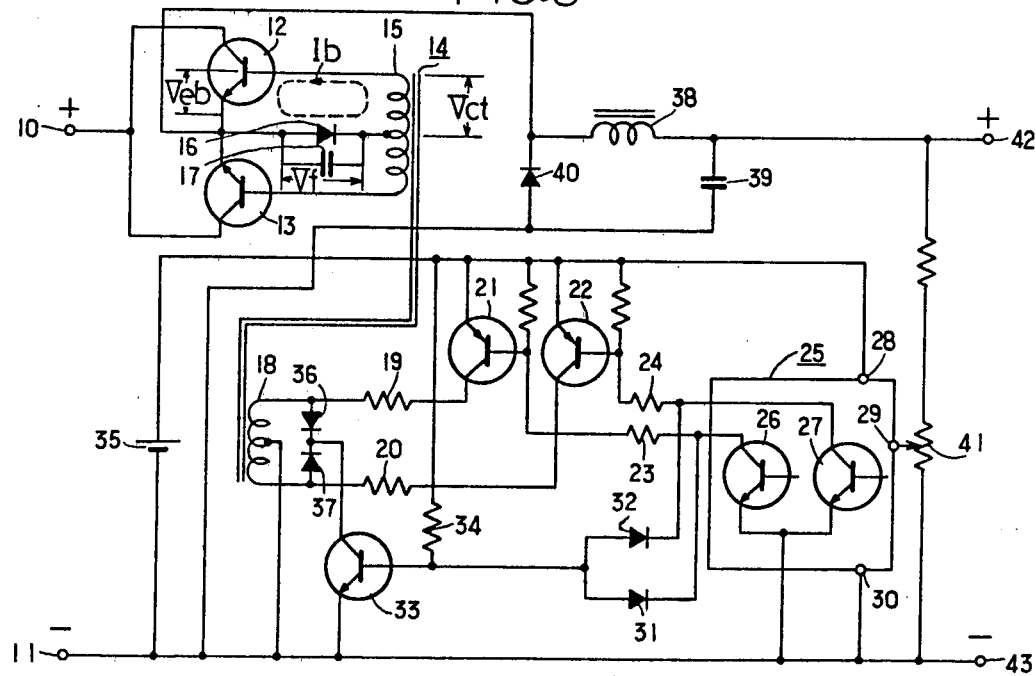
FIG. 6 is an electric circuit diagram representing a first embodiment of the switching regulator according to the present invention.

Referring now to the drawings, there is given a detailed description of the preferred embodiments of the present invention. FIG. 6 shows a series type (a so-called voltage dropping chopper type) circuit representing the first embodiment of the present invention.

The collectors of two switching main transistors (12) and (13) are connected together to a positive-side terminal (10) of power terminals (10) and (11) and also the emitters are connected together to an output side. Further, a secondary winding (15) of a current transformer

(14) is connected between the bases of said main transistors (12) and (13) and at the same time, a parallel circuit comprising a diode (16) and a condenser (17) is put between the neutral point of the secondary winding (15) and the emitters of said main transistors (12) and (13).

Both ends of a primary winding (18) of said current transformer (14) are joined to transistors (26) and (27) of a control circuit (25) through resistors (19) and (20), amplification transistors (21) and (22) and resistors (23) and (24). Said control circuit (25), for example, comprises a pulse length control IC (integrated circuit) whereon a type name of SG3524 has been put and includes a relative input terminal (28), an invert input terminal (29) and an earthing terminal (30) in addition to said transistors (26) and (27) giving out pulses alternately at phase difference of 180 degrees. The control circuit (25) further contains a voltage regulator, a transmitter, a flip flop, a comparator, an error detecting amplifier and an overcurrent comparator, all of which are not shown by the drawings thereof.

Two diodes (31) and (32) are connected to the collectors of the transistors (26) and (27) of aforesaid control circuit (25) and an anode common to said diodes (31) and (32) is connected to the base of a control transistor (33) and further connected to a positive side of an auxiliary power supply (35) through a resistor (34). The collector of said control transistor (33) is connected to the primary winding (18) of said current transformer (14) through diodes (36) and (37) incorporating a common cathode. Moreover, (33) is a smoothing reactor, (39) is a smoothing condenser, (40) is a commutation diode, (41) is an output voltage detecting resistor and (42) and (43) are an output terminal.

Referring now to FIG. 7, there is given a description of the action of the circuit of FIG. 6.

In FIG. 7, (a) is voltage ($V_{ec}$) across emitter and collector of the main transistors (12) and (13), (b) and (c) are respectively the collector current ($I_c$) of the main transistors (12) and (13), (d) and (c) are the base current ($I_b$) of the main transistors (12) and (13), (f) is the secondary output voltage ($V_{ct}$) of said current transformer (14), (g) and (h) are respectively the emitter-base voltage ($V_{eb}$) of the main transistors (12) and (13) and (i) and (j) are respectively voltage across emitter and collector of the transistors (26) and (27) contained in the aforesaid control circuit (25).

As will be apparent from (i) and (j), the outputs of the transistors (26) and (27) are symmetrical with a difference of 180 degrees and also, ($T_1-T_2$) is the (conduction) time of the transistor (26) and ($T_4-T_5$) is the (conduction) time of the transistor (27), respectively.

Once the transistor (26) is energized in ($T_1-T_2$), voltage and current are supplied to the primary winding (18) of the current transformer (14) through the transistor (21) and the resistor (19), and then is induced to the secondary winding (15), whereby base current ($I_b$) is delivered to the main transistor (12) at one side as shown by short dashes in FIG. 6. In the meantime, base current which is ought to flow to the control transistor (33) through the resistor (34) goes to the transistor (26) through the diode (31) without flowing to the control transistor (33), thus resulting in the interrupted condition of control transistor (33) being maintained.

When the transistor (26) is interrupted at time ($T_2$), as the transistor (27) is in interrupted condition at that point of time, the base current is supplied to the control transistor (33) via the resistor (34) and the primary winding (18) of the current transformer (14) is thus placed in a short-circuit condition.

Then, base current ($I_b$) in FIG. 6 flows reversely during in time ($T_2-T_3$) as shown in FIG. 7 (d). As a consequence, the storage time and breaking characteristic of the main transistor (12) become more quicker and better and the switching characteristic thereof can be improved to the best possible condition. When the interruption of the main transistor completes at time ($T_3$) and the time gets to ($T_3-T_4$), the short-circuit condition of the primary winding (18) of the current transformer is maintained as it is. As voltage ($V_f$) at the both ends of the condenser (17) in FIG. 6 remains then, continuity between emitter and base of the main transistors (12) and (13) is retained by reverse bias voltage during times ($T_3-T_4$) and ($T_6-T_1$) as shown in FIG. 7 (g) and (h). This is vitally important for preventing unstable operation resulting from noise voltage and others in a period of shutdown. When the time gets to ($T_4$) and the other transistor (27) works, exactly the same change as that after initiation of the operation of one transistor (26) in ($T_1$) is followed thereafter. Once the time gets to the next $T_1$), the one transistor (26) starts working again and subsequently, the afore-mentioned operation is repeated.

Figure 1:
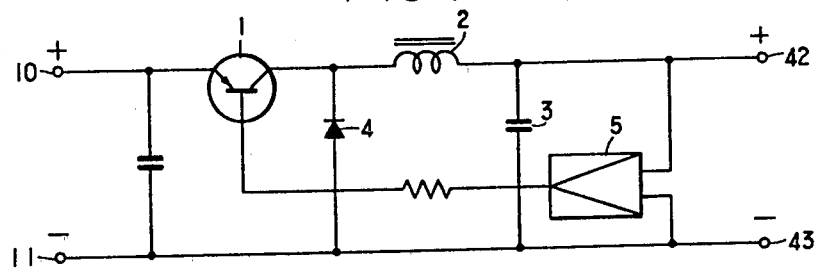
FIG. 1 is a primary electric circuit diagram of the switching regulator of series type.
Figure 2:
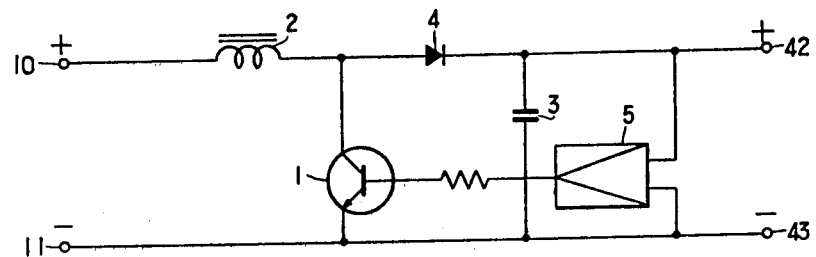
FIG. 2 is a primary electric circuit diagram of the switching regulator of parallel type.
Figure 3:
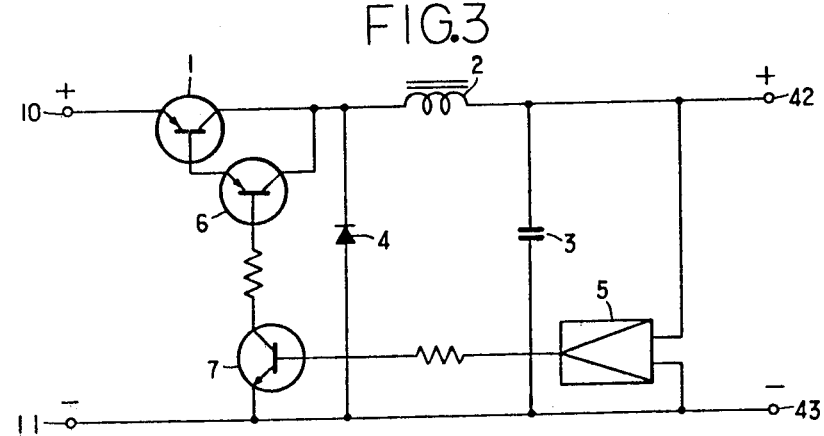
FIG. 3 is a practical electric circuit diagram of the circuit of FIG. 1.
Figure 4:
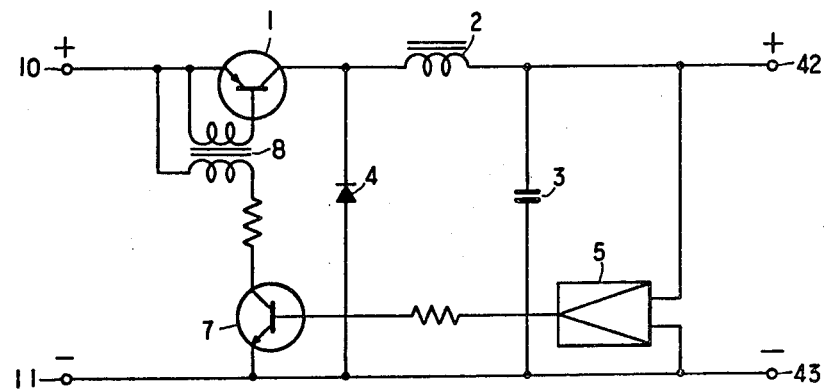
FIG. 4 is a practical electric circuit constructed by further providing a transformer.
Figure 5:
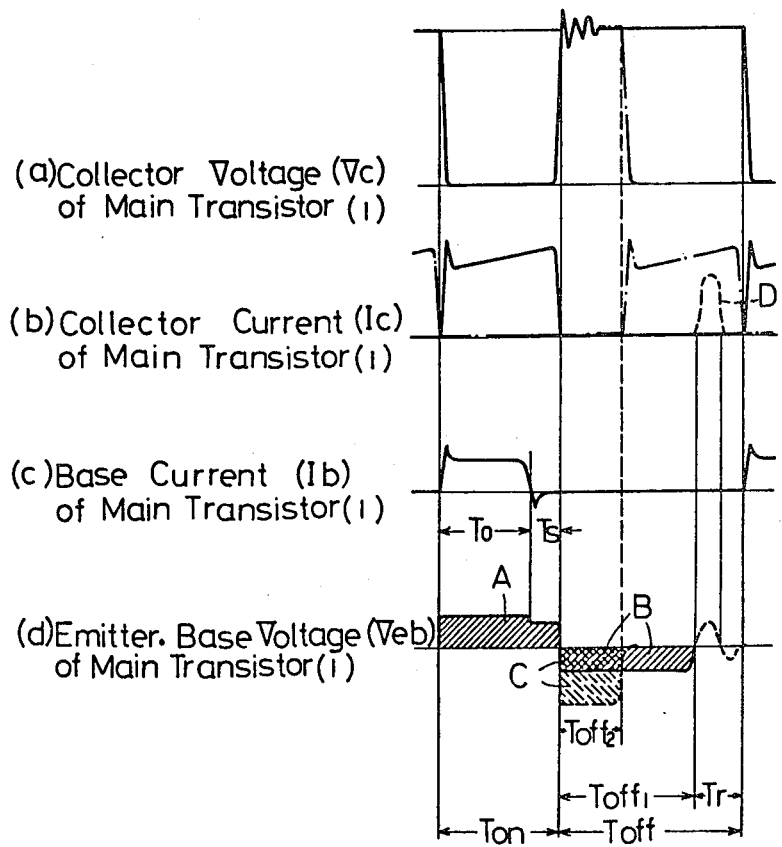
FIG. 5 is a diagrammatic representations of the waveforms of each part in FIG. 4.

FIG. 3 shows a parallel type (a so called voltage increasing booster type) circuit representing the second embodiment of the present invention and even in this circuit, the switching operation of the main transistors (12) and (13) is accomplished in exactly the same efficient way as in the first embodiment of FIG. 6.

Figure 8:
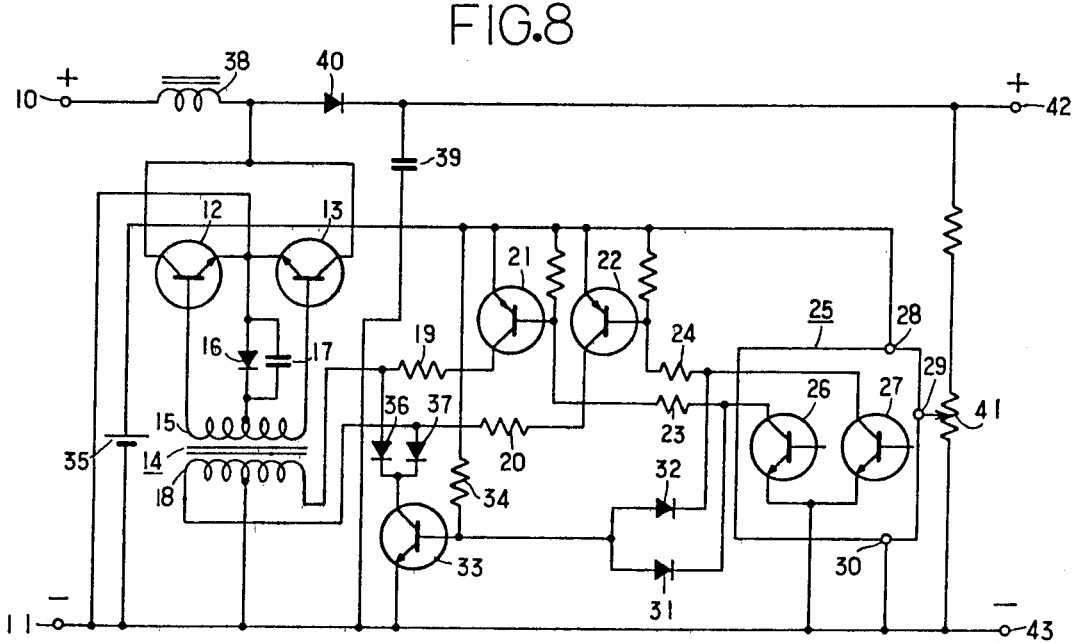
FIG. 8 is an electric circuit diagram representing a second embodiment of the present invention.
Figure 9:
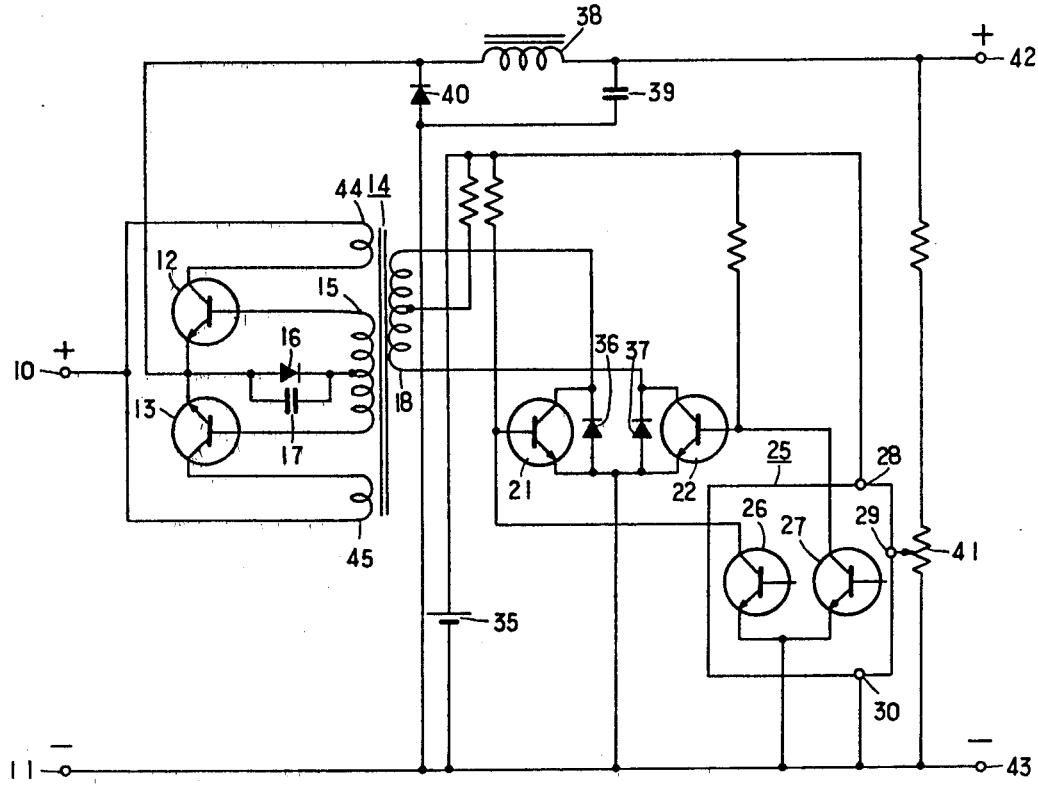
FIG. 9 is an electric circuit diagram representing a third embodiment of the present invention.

FIG. 9 shows the third embodiment exemplifying an application in accordance with the present invention. In this embodiment, windings (44) and (45) are further fitted to the current transformer (14) for the feedback of the collector current of the main transistors (12) and (13). It is seen that this circuit is also appicable since the current transformer (14) is left shorted at a time of interruption of the transistors (12) and (13) as in FIG. 6 and FIG. 8.

Further in FIG. 9, the basic operation is identical though the control system of two windings (44) and (45) of the current transformer (14) by means of the control circuit (25) differs somewhat from that in FIG. 6 and FIG. 8. More particularly, in ($T_1-T_2$) in FIG. 10, voltage ($V_{ct1}$) shown in FIG. 10 (c) is applied to the current transformer (14) via the transistor (22) and when the transistor (21) is energized in ($T_2-T_3$), the current transformer (14) is shorted through the diode (37) provided in parallel with the transistor (22) and the transistors (21) and (22) work to retain the short-circuit condition of the current transformer (14) in ($T_2-T_3-T_4$). And at ($T_4$), the transistor (27) is energized and the transistor (22) is interrupted.

Figure 10:
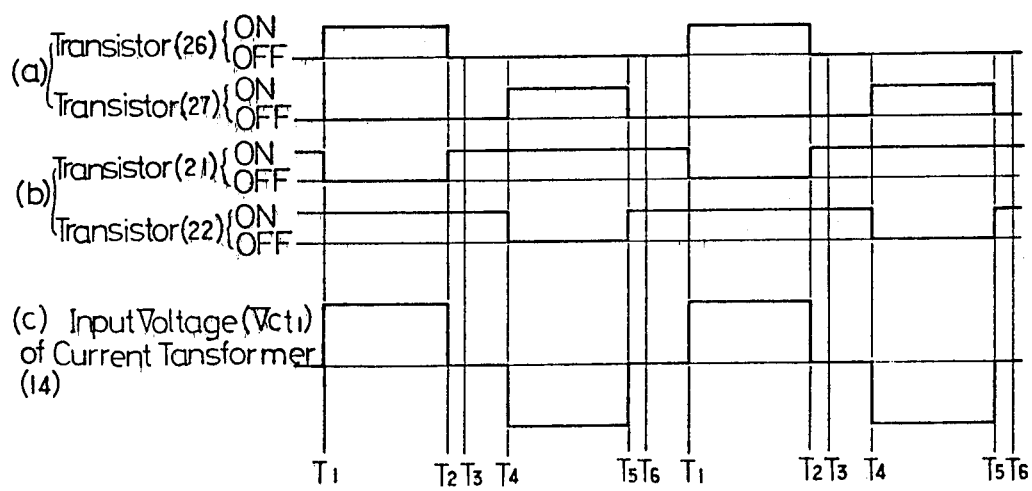
FIG. 10 is an explanatory diagrammatic representations of the operation of each part in FIG. 9 and the output waveforms thereof.

Then, voltage ($V_{ct1}$) in FIG. 10 (c) is applied to the current transformer (14) through the transistor (21). Thus, exactly the same operation as the characteristic in FIG. 7 is repeated.

What is claimed is:
1. A switching regulator, comprising:
   a main circuit having a smoothing reactor, a smoothing condenser and a commutation diode and a switching main transistor means operatively associated therewith for providing an output voltage, said switching main transistor means comprising at least two switching main transistors connected in parallel with each other;

a control circuit operable to detect and amplify the output voltage of said main circuit for controlling conduction and nonconduction of said main transistor means, said control circuit including two transistors having respective periods of nonconduction wherein a period of nonconduction of one said control circuit transistor overlaps in time with a period of nonconduction of the other said control circuit transistor, said control circuit transistors having output means for producing pulses alternately at a phase difference of 180°;

a current transformer having a primary winding and a secondary winding, said secondary winding and a diode and condenser being connected between the base and emitter of a said switching main transistor; and means connecting said two transistors of said control circuit to the respective ends of said primary winding of said current transformer, said connecting means including a switching element connected for shorting said ends of the primary winding of said current transformer when said two control circuit transistors are nonconductive simultaneously.

2. A switching regulator according to claim 1, wherein said main circuit substantially defines a voltage dropping chopper-type circuit constructed by connecting said switching main connector means in series with a load.

3. A switching regulator according to claim 1, wherein said main circuit substantially comprises a voltage increasing type circuit constructed by connecting said switching main transistor means parallel with a load.

4. A switching regulator according to claim 1, in which said connecting means includes a pair of transistors interposed between respective ones of said control circuit transistors and respective ends of said primary winding of said current transformer, said switching element comprising a further transistor, first means coupling said further transistor to said control circuit transistors for conduction of said further transistor when said control circuit transistors are simultaneously nonconductive, and second means coupling said further transistor to the opposite ends of the primary winding for short-circuiting same by conduction of said further transistor.

5. A switching regulator according to claim 4, wherein said first coupling means includes a first parallel pair of diodes connecting the base of said further transistor to the collectors of said control circuit transistors, which latter collectors connect to the respective bases of said pair of connecting means transistors for rendering said further transistor conductive when the two control circuit transistors are simultaneously nonconductive, said second coupling means including a second parallel pair of diodes respectively connected from respective ends of said primary winding to a common point in turn connected by conduction of said further transistor to a center tap of said primary winding for carrying out said shorting of the ends of the primary winding.

6. A switching regulator according to claim 1, in which said connecting means comprises a further pair of transistors respectively interposed between respective ends of said primary winding and respective ones of said control circuit transistors, said further pair of transistors being connected to their respective control circuit transistors to conduct when their respective control circuit transistors are nonconductive, such that said further pair of transistors have periods of conduction which overlap with each other, said further pair of transistors defining said switching element, said further pair of transistors each having its main current electrodes connected in series with a center tap of the primary winding and a current source and a respective end of the primary winding for applying substantially a zero input voltage across the two ends of the primary winding through periods of simultaneous conduction by said further pair of transistors.

7. A switching regulator according to claim 1, in which the secondary winding of the current transformer is connected between the bases of the main transistors, a parallel circuit comprising said diode and condenser being connected between the neutral point of the secondary winding and the emitters of the main transistors.

* * * * *